United States Patent [19]

Schreiber et al.

[11] Patent Number: 5,569,685

[45] Date of Patent: Oct. 29, 1996

[54] AQUEOUS COATING AGENT AND ITS USE IN PROCESSES FOR COATING PLASTICS SUBSTRATES

[75] Inventors: Peter Schreiber, Hattingen; Stefanie Goecke, Ennepetal; Reinhard Windmann, Wuppertal, all of Germany

[73] Assignee: Herberts GmbH, Wuppertal, Germany

[21] Appl. No.: 395,122

[22] Filed: Feb. 27, 1995

[30] Foreign Application Priority Data

Mar. 4, 1994 [DE] Germany .......................... 44 07 121.3

[51] Int. Cl.$^6$ .............................. C08K 3/20; C08L 63/02
[52] U.S. Cl. ...................... 523/406; 427/413.3; 524/507
[58] Field of Search .......................... 523/406; 524/507; 427/412.3

[56] References Cited

U.S. PATENT DOCUMENTS 4,981,730  1/1991  Zaleski .

FOREIGN PATENT DOCUMENTS

0466136A1  1/1992  European Pat. Off. .
4027128    3/1992  Germany .
54-153832  12/1979  Japan .

*Primary Examiner*—Melwyn I. Marquis
*Assistant Examiner*—D. Aylward
*Attorney, Agent, or Firm*—Keck, Mahin & Cate

[57] ABSTRACT

Aqueous two-component coating agents contain 7.5 to 25 wt. % of at least one epoxide resin in the form of a dispersion, with respect to the resin solids, 1.5 to 15 wt. % of at least one water-miscible polyamine, 2 to 15 wt. % of at least one chlorinated polyolefin with a degree of chlorination of 15 to 40 wt. %, 0 to less than 5 wt. % of one or more organic solvents, 35 to 85 wt. % of water, and conventional lacquer additives, pigments and fillers. The coating agents are suitable for use in processes for coating plastic substrates, in particular polyolefin substrates.

14 Claims, No Drawings

AQUEOUS COATING AGENT AND ITS USE IN PROCESSES FOR COATING PLASTICS SUBSTRATES

FIELD OF THE INVENTION

The invention relates to a coating agent based on cross-linking binder systems together with chlorinated polyolefins (CPO), which are used to coat plastics substrates. Furthermore, multilayered lacquer films for the substrates are described as well as a process for their production.

BACKGROUND OF THE INVENTION

The use of polypropylene (PP) in pure form and also as a rubber modified, impact resistance adjusted version (PP-EPDM blends) for workpieces has been steadily increasing in a number of areas of application, in particular due to its excellent properties as compared with other plastics. In the automobile sector especially, PP has become the choice for internal and external automobile parts, it being used for instance for bumpers, wing-mirror holders, door handles, etc.

When using PP add-on pieces in external fields of use, it is often desirable, and it is happening more and more frequently, that the workpieces are lacquered for decorative and protective reasons. Unfortunately, due to the only very low surface tension and low polarity of PP, it is difficult to produce both adequate coating film formation and also sufficiently good adhesion to the substrate. This problem can be solved on an industrial scale by, for instance, physical-chemical pretreatment processes on PP, such as, for instance, flame treatment or low pressure plasma activation. In both methods, a polar substrate surface is produced which can then be coated without any problem. The surface activation produced in this way, however, tends to reverse and in addition these activation processes require expensive equipment. Some processes can only be operated batchwise (plasma) while some result in defective spots when the workpieces have a complex shape (flame treatment).

Another solution to the problem is the use of coating systems, such as, for instance, the use of chlorinated polyolefins (CPO) dissolved in organic solvents, wherein the CPO is used either on its own (e.g. U.S. Pat. No. 4,303,697, U.S. Pat. No. 4,070,421 and U.S. Pat. No. 3,579,485) or combined with a film-forming polymer such as e.g. acrylate or urethane polymers. The CPO produces outstanding adhesion to PP substrates. Chlorination itself is required in order to ensure adequate solubility in the solvents used such as, for instance, toluene or xylene. The relatively poor compatibility of CPO with conventional binder resins, however, is a disadvantage.

All these coating systems, however, have the serious disadvantage of the presence of very large amounts of volatile, mostly also aromatic, solvents which ought to be drastically reduced for reasons which relate to the environment and occupational safety.

Furthermore, WO 93/01 244 describes aqueous compositions which consist of chlorinated polyolefins (CPO) and a high proportion of a non-ionic emulsifier as well as amines and water for neutralisation purposes. These compositions may be used as primers or optionally stirred into the paint.

WO 90/12 056 also describes aqueous, generally solvent-free, compositions based on CPO and anionic emulsifiers and water, which are produced by a special process. Coating agents may optionally be produced from these compositions by the addition of polyurethane resins. These polyurethane resins are described as anionically stabilised resins.

WO 90/12 656 describes aqueous coating agents based on low molecular weight alcohols, chlorinated resins and emulsifiers and amines acting as emulsifiers. These coating agents are intended to have a solids content of less than 5 wt. %. They are applied directly to the substrate being coated.

The aqueous coating agents mentioned above are those which are applied to a plastics substrate, physically dried and then over-coated with further coating agents. They have the disadvantage that, after conventional drying of these systems, coatings are obtained which exhibit obvious weaknesses with regard to water resistance and adhesion to the substrate when they are subject to condensation or storage under wet conditions. This leads to defects in adhesion of the upper layers of lacquer which produces optical damage and also has an adverse effect on the mechanical stability of the workpiece.

SUMMARY OF THE INVENTION

The object of the present invention is, therefore, to provide a coating agent which can be used as an adhesive primer on non-pretreated polyolefin substrates and ensures outstanding adhesion at elevated and low temperatures as well as in the presence of water. Furthermore, the increased requirements with regard to protection of the environment, in particular with reference to the use of organic solvents, are intended to be taken into account.

This object is achieved by providing a coating agent for coating plastics substrates which is based on cross-linking, water-dilutable, two-component (2C) resin systems and CPO and which contains only small proportions of organic solvents.

This coating agent is characterised in that it contains 7.5 to 25 wt. % of at least one epoxide resin in the form of a dispersion,
1.5 to 15 wt. % of at least one water-miscible polyamine,
2 to 15 wt. % of at least one chlorinated polyolefin (CPO) with a degree of chlorination of 15 to 40 wt. %,
0 to less than 5 wt. % of one or more organic solvents,
and 85 to 35, preferably 35 to 50 wt. %, of water, as well as conventional lacquer additives, pigments and/or fillers. The preceding wt. % refer to the resin solids, provided they refer to resins. The coating agent contains water as the main solvent.

The coating agent is intended to be provided as a two-component coating agent and is mixed and converted into a form which can be cross-linked only just before application.

The epoxide components in the aqueous epoxide resin dispersion which can be used according to the invention are, for example, commercially available water-dilutable, film-producing di or polyepoxides. These may be aqueous dispersions or aqueous solutions. They are generally not chlorinated epoxide resins.

Examples of such polyepoxides are polyglycidyl ethers based on aliphatic and/or aromatic diols, such as bisphenol A, bisphenol F, novolak resins or polyalkylene glycols, which can react, via functional OH groups, with compounds which contain epoxide groups, such as epichlorhydrin. Further examples of polyepoxide compounds are the reaction products of aromatic diphenols with aromatic polycarboxylic acids to give polyesters. These react with, for example, 2,3-epoxipropanol-(1) to give epoxide compounds.

DETAILED DESCRIPTION OF THE PREFERRED EMBODIMENTS

Further examples are glycidyl-functionalised (meth-)acrylic polymers. In this case, the glycidyl functional monomers are incorporated by polymerisation. e.g. via glycidyl(meth)acrylate, or OH-containing acrylates are modified after polymerisation, via the OH groups, to give compounds which contain epoxide groups. The properties of the polymers can be influenced by incorporating other unsaturated comonomers during reaction.

The epoxide resins are preferably built up so that they can be diluted with water. This can take place by incorporating hydrophilic groups during reaction, such as non-ionic groups, e.g. polyether structures, polyol structures, or by incorporating ionic groups during reaction. The epoxide resins may also be converted in the water phase using additional ionic or non-ionic self-emulsifying epoxide resins. The use of epoxide resin dispersions which contain only self-emulsifying epoxide resins is preferred. Aqueous dispersions which do not contain any emulsifiers can be produced in this way. It is also possible to add emulsifiers. It has been shown, however, that it is advisable to reduce the amount of external emulsifiers and to prepare emulsions which do not contain any emulsifiers. Examples of the type of aqueous epoxide resin dispersions which can be used are described in DE-A-36 43 751, DE-A-30 20 301 or U.S. Pat. No. 4,987,163. These are epoxide resins based on aromatic diols which are modified by introducing hydrophilic groups and which produce stable aqueous emulsions without additional emulsifiers.

The molecular weight (number average, Mn) of the epoxide resins is preferably up to 50000, the lower limit being 300. If epoxide resins with an Mn of less than 1000 are used, they are still liquid at temperatures up to 30° C., whereas resins with a higher Mn are present as solid substances. The use of solid epoxide resins is preferred.

The viscosity can optionally be reduced by a small proportion of plasticising, in particular non-volatile, substances. The epoxide equivalent weight of the binder is preferably 250 to 10000.

Polyamine compounds are present as reactive (cross-linking) components in this two-component coating agent. The types which may be used are those which are described as cross-linking agents in the literature. They can be varied within wide limits. They contain reactive amino groups and optionally functional groups which increase their solubility in water. Polyamines which are suitable as cross-linking agents may have low molecular weights, but may also have film-producing properties. The polyamine cross-linking agents are in particular amino resins or polyamine resins.

The cross-linking agent must have an adequate number of reactive groups. The equivalent weight per active H atom is preferably 50 to 500, in particular 100 to 400. The molecular weight may vary within wide limits as long as the reactivity and water-solubility or water-dispersibility are preserved. A number average molecular weight of 500 to 20000 is preferred.

The polyamine cross-linking component is selected so that water-dilutability or water-solubility is provided. This can be achieved by an appropriate choice of the number of polar groups such as, for example, OH groups, amino groups, urea groups or polyether structures. The cross-linking component may either be available as an aqueous dispersion or it may be available in a concentrated form and diluted during processing with water or an aqueous dispersion. Polyamine resins based on aliphatic compounds are preferred. Suitable polyamines contain 2 or more amino groups, wherein the amino groups may be of the primary and/or secondary type. Furthermore, other functional groups may optionally be present.

Examples of suitable polyamines are described in EP-A-0 240 083 or EP-A-0 346 982. Examples of these are aliphatic and/or cycloaliphatic amines with 6 to 24 carbon atoms which contain 2 to 10 primary amino groups and 0 to 5 secondary amino groups.

Polyamine resins may also be polymers which contain no amino groups which are subsequently modified by reacting with excess amino groups. Examples of these are polyglycidyl ethers based on bisphenol A, bisphenol F, novolak resins or epoxidised polybutadienes which are subsequently reacted with di or polyamines, wherein an excess of amino groups must be provided.

Furthermore, polyamine isocyanate adducts may be used. In this case conventional aliphatic, cycloaliphatic and/or aromatic polyisocyanates are suitable as isocyanates. The isocyanate groups react with the polyamines in amounts such that there is still an adequate number of reactive amino groups present after reaction.

Examples of acryloyl unsaturated compounds for preparing polyamine adducts which can be used according to the invention are described in U.S. Pat. No. 4,303,563 or EP-A-0 262 720 or EP-A-0 179 954. These are polyamines which have been modified with unsaturated compounds which optionally may also be added afterwards.

Commercially available materials, for example, may be used as chlorinated polyolefins. These are in particular chlorinated polyethylene, chlorinated polypropylene or chlorinated copolymers thereof. Mixtures of this type of polymer may also be used. The chlorinated polyolefins have a degree of chlorination of 15 to 40 wt. % and the molecular weight (Mn) of the CPOs is preferably 700 to 70000. The polymers may optionally be modified, e.g. by incorporating polar groups such as, for example, maleic anhydride. They may be provided as a powder or an aqueous suspension. In particular, they should contain no, or only a small proportion of, organic solvents. The major proportion of the organic solvent is optionally removed by distillation.

The CPOs are preferably used as an aqueous dispersion. These dispersions may still contain a small proportion of organic solvent due to the method of production and may also contain anionic or non-ionic emulsifiers. For example, the CPO fraction in the coating agent can be added in the form of dispersions analogous to those in WO 93/01 244 or WO 90/12 056. In this case the proportion of emulsifier is kept as small as possible.

Conventional lacquer solvents are suitable as organic solvents. The amount of organic solvent should be kept as small as possible. Non-aromatic solvents are preferably used. Also, solvents which are at least partially miscible with water are preferably used. Solvents increase the stability of the aqueous emulsions according to the invention. Furthermore, they aid the flow properties of the lacquer film applied. Optionally present functional groups in the solvent should not react, or react only very slowly, with the cross-linkable resin component under cross-linking conditions. Examples of solvents which can be used are ketones such as methylisobutyl ketone, acetone, cyclohexanone, N-methylpyrrolidone; hydrocarbons such as xylene, Solvesso®, cyclohexane; alcohols such as butanol, isopropanol, butanediol, propanediol, amyl alcohol, ethoxypropanol, methoxypropanol; glycol ethers such as ethyl glycol, butyl glycol.

The coating agents may also optionally contain additives and pigments. Additives are understood to be conventional lacquer additives such as wetting agents, dispersion aids, antifoaming agents, flow promoters, catalysts, rheology additives and anti-crater agents. These substances must be compatible with the epoxide resin dispersion.

Conventional pigments or fillers may be used as pigments. These may have an organic or inorganic base such as, for example, titanium dioxide, carbon black, aluminium silicate or silicon dioxide or cross-linked polymeric microparticles. Organic or inorganic colorants may also optionally be used. The pigments and fillers may be dispersed by known methods. They may be rubbed into either the epoxide resin dispersion or preferably the amine component in solvent-containing form or in dispersion form. Optionally, it is also possible to finely disperse the pigments in small amounts of an additional binder, a paste resin, e.g. based on a polyurethane resin. The equipment and procedures required for this are familiar to a person skilled in the art.

Other binders may also optionally be present in the coating agents. It is preferable that these binders do not react with the cross-linking components. Polyurethane dispersions in particular may be added to the coating agents. The polyurethane resins (PU) are presented in a water-stabilised form, in which case anionic stabilisation may be used, preferably, however, non-ionic stabilisation. This may be supported, for example, by incorporating hydrophilic groups such as polyhydroxyl groups or polyether groups. If possible, no additional emulsifiers should be used. A further preferred embodiment uses a PU resin based on aliphatic units as an additional binder. The PU dispersion should be compatible with the epoxide resin dispersion as a binder mixture. It is also possible to mix the aqueous polyurethane dispersion with the amine cross-linking agent.

The coating agent is provided as a two-component (2C) coating agent, i.e. the epoxide resin and amino resin are provided as separate components. To use the coating agent, a mixture of the two components, epoxide resin and amino resin, is produced. It does not matter whether the CPO dispersion, the solvent, the additional polyurethane resin, the pigments or the additives are present in the epoxide resin component or in the amino resin component. It is only the storage stability of each of the individual components which has to be ensured. However, it has proven advisable, optionally to mix the PU dispersion with the amino resin component, while the pigments and the CPO fractions are preferably present in the amine component. The components are mixed immediately before application. A coating agent is obtained which reacts and cross-links at room temperature. Thus it can be processed for only a limited time after mixing. In order to accelerate the cross-linking reaction, catalysts may be added or the cross-linking temperature may be increased.

The ratios of amounts are chosen so that the ratio of reactive hydrogen atoms in the cross-linking component to epoxide groups in the epoxide resin is 0.7:1 to 1.5:1, preferably 0.9:1 to 1.3:1. The additional binder essentially does not contribute to the cross-linking reaction.

Thus, the 2C coating agent contains:

7.5 to 25 wt. % of one or more epoxide resin dispersions (with respect to the resin solids),
1.5 to 15 wt. % of one or more water-miscible polyamines, e.g. amino resins,
2 to 15 wt. % of one or more chlorinated polyolefins with a degree of chlorination of 15 to 40 wt. %,
0 to less than 5 wt. % of one or more organic solvents.

A preferred embodiment contains:

0 to 15 wt. % of a polyurethane dispersion (with respect to the resin solids).

The epoxide resin dispersions preferably contain no emulsifier. The amount of optionally present emulsifier should be as small as possible. In particular, the sum of the emulsifiers in the separate constituents should be less than 0.5%. The PU dispersion is preferably non-ionically stabilised. The PU resin is preferably based on aliphatic components. The amount of organic solvents is less than 5%, in particular of non-aromatic solvents which contain polar groups.

Plastics substrates are preferred as substrates, modified or non-modified polyolefins being used in particular. Examples of these are in particular polyethylene or polypropylene substrates and substrates made from copolymers or mixtures of these. Since the coating agents according to the invention may be cross-linked over a wide range of temperatures, starting at low temperatures, the cross-linking temperature can be selected in accordance with the thermal sensitivity of the substrate.

The coating agent is applied to a conventionally pretreated, in special cases also not pretreated, substrate optionally after a cleansing process. Then the coating is chemically cross-linked, optionally supported by an elevated temperature of up to 100° C. The temperature range is preferably 20° to 80° C. After cross-linking, homogeneously coated plastics substrates with a smooth, defect-free surface are obtained. Adhesion to the substrate is good. The mechanical properties of the lacquered article are not adversely affected, especially not at low temperatures (low temperature impact strength). The coatings obtained have films with a high water resistance, e.g. according to DIN 50 017 or ISO 2812-2, i.e. the cross-linked film does not lose its adherence or develop other defects even in the presence of water or water vapour.

The coatings obtained in this way may also be designed as single-layered top coats, if they are pigmented with colours. Preferably, however, it is also possible to apply one or more further coats, e.g. base lacquer/clear lacquer coats or single top coats. The multi-layered structures obtained in this way also exhibit good adhesion to the substrate, good low-temperature elasticity and no significant changes or loss of adhesion in the presence of moisture. They are used without an additional adhesion primer. The coating agents are particularly suitable for coating heat-sensitive plastics substrates in the automobile industry.

EXAMPLE 1

11% of a commercially available paste resin (according to EP-A-0 438 090, example 2; 40% solids), 6% of water, 2% of a commercially available wetting agent and antifoaming agent are mixed with each other and 26.3% of a commercially available titanium dioxide, 5% of a sheet silicate and 0.2% of carbon black are incorporated into this and milled on a pearl mill for 20 minutes at a maximum of 45° C. To this pigment paste is added a mixture of 12.5% of a non-ionic polyurethane resin dispersion (aliphatic isocyanate and polyester units, 40% solids) and 1% of N-methylpyrrolidone and 0.5% of water. Then 2% of dipropyleneglycol dimethyl ether, 0.3% of a commercially available thickener (30% in water; acrylate base) and 8.8% of a commercially available polyamine (H equivalent weight 200) and 23% of a CPO emulsion (20% strength in water) are added. The viscosity is adjusted with 1.5% of water after homogenising.

97% of an epoxide resin dispersion (54% solids according to DE-A-38 20 301, example III.7) and 3% of xylene are mixed.

A coating agent is prepared from 75 parts of the pigmented amine resin component and 25 parts of the epoxide resin component and the viscosity is optionally adjusted with a little water. This coating agent is applied to the substrate within 30 minutes.

EXAMPLE 2

11% of a commercially available paste resin according to example 1, 6% of water, 2% of a commercially available wetting agent and antifoaming agent are mixed together and then 28% of a commercially available titanium dioxide, 5.3% of a sheet silicate and 0.2% of carbon black are incorporated and milled on a pearl mill for 20 minutes at a maximum of 45° C. To this pigment paste are added 2.5% of a polyurethane resin dispersion according to example 1 and 1% of NMP together with 0.5% of water. Then 2% of dipropyleneglycol dimethyl ether, 0.3% of a commercially available thickener (30% in water, acrylate base) and 8.8% of a commercially available polyamine (H equivalent weight 200) and 23% of a CPO emulsion (20% strength in water) are added. The viscosity is adjusted with water after homogenising.

97% of an epoxide resin dispersion (53% solids according to DE-A-38 20 301, example II.3) and 3% of Solvesso 100 are mixed.

A coating agent is prepared from 75 parts of the pigmented component and 25 parts of the epoxide resin component and the viscosity is optionally adjusted with a little water. This coating agent is applied to the substrate within 30 minutes.

EXAMPLE 3 (COMPARISON EXAMPLE)

37.5% of a non-ionic polyurethane dispersion (Uraflex XP401 UZ, 40% in water) is mixed with 20.0% of titanium dioxide, 2.5% of sheet silicate and 0.1% of carbon black and milled on a pearl mill for 20 minutes at a maximum of 45° C. To this paste are added 37.5% of a CPO emulsion (24% in water) and then 2.0% of butyl glycol, 0.1% of a commercially available antifoaming agent and 0.4% of a commercially available thickener (5% strength in water, polyurethane base). The viscosity may optionally be adjusted with a little water.

The coating agent can be applied to a plastics substrate by spraying.

PRODUCTION EXAMPLE OF A PRIMER COAT

The resulting primer coating agents are applied to the degreased substrate (Keltan®TP 0550 from DSM) by spraying to give a dry film thickness of ca. 25 μm. The film is left to evaporate for 10 minutes and then dried for 15 minutes at 80° C. Afterwards, the lacquer may be built up further using commercially available products.

Lacquer structure: 25 μm of two-component primer according to examples 1–3.
35 μm of a commercially available two-component single top coat lacquer
(R. 47131 from Herberts *GmbH*)

Tests on resistance to atmospheric moisture (DIN 50017, condensed water test conditions), adhesion to subsequent layers (DIN 53151) and elasticity when punctured (DIN 53443 part 2, bond to substrate) produced very good results, even at −25° C.

The comparison test gave a very poor result in the test for resistance to atmospheric moisture. Damage to the surface of the lacquer was observed. Adhesion between the individual layers exhibited clear defects.

We claim:

1. Aqueous two component coating agents for coating plastics substrates, consisting essentially of:

7.5 to 25 wt. % of at least one epoxide resin in the form of a dispersion, wherein wt. % refers to resin solids, 1.5 to 15 wt. % of at least one water-miscible polyamine as cross-linking agent, 2 to 15 wt. % of at least one chlorinated polyolefin with a degree of chlorination of 15 to 40% wt. %, 0 to less than 5 wt. % of one or more non-aromatic organic solvents selected from the group consisting of ketones, hydrocarbons, alcohols and glycol ethers, 35 to 85 wt. % of water, and at least one additive selected from the group consisting of pigments and fillers, wherein the epoxide resin and polyamine are present in separate components.

2. A coating agent according to claim 1, wherein at least one chlorinated polyolefin is in the form of an aqueous dispersion.

3. A coating agent according to claim 1, wherein at least one chlorinated polyolefin is present together with the polyamine as a component.

4. A coating agent according to claim 1, wherein the epoxide resin has an epoxide equivalent weight of 250 to 10000.

5. A coating agent according to claim 4, wherein the epoxide resin is solid epoxide resin.

6. A coating agent according to claim 1, which is essentially free of aromatic solvents.

7. A coating agent according to claim 1, comprising up to 15 wt. % of at least one aqueous polyurethane dispersion, wherein wt. % refers to resin solids.

8. A coating agent according to claim 7, wherein the polyurethane is non-ionically stabilized.

9. A process for coating a plastics substrate, comprising using a coating agent according to one of claims 1 to 8.

10. A process for producing a multi-layered lacquer film, comprising applying a coating agent according to one of claims 1 to 8 as a first layer to a substrate as a primer and subsequently applying one or more further layers.

11. A process according to claim 9 comprising coating polyolefin based plastic molded items, with or without pretreatment.

12. A process for using a coating agent according to one of claims 1 to 8 to coat plastics substrates.

13. A process according to claim 10, comprising coating polyolefin based plastic molded items, with or without pretreatment.

14. A process for using a coating agent according to claim 12 comprising coating polyolefin substrates with the coating agent.

\* \* \* \* \*